United States Patent
Embid Droz et al.

(10) Patent No.: US 9,921,338 B2
(45) Date of Patent: Mar. 20, 2018

(54) SELECTING AND OPTIMIZING OIL FIELD CONTROLS FOR PRODUCTION PLATEAU

(71) Applicants: Repsol, S.A., Madrid (ES); International Business Machines Corporation, Armonk, NY (US)

(72) Inventors: Sonia Mariette Embid Droz, Madrid (ES); Ruben Rodriguez Torrado, Madrid (ES); Mohamed Ahmed Hegazy, Heliopolis Cairo (EG); David Echeverria Ciaurri, New York, NY (US); Ulisses T. Mello, Blauvelt, NY (US)

(73) Assignees: REPSOL, S. A., Madrid (ES); International Business Machines Corporation, Armonk, NY (US)

( * ) Notice: Subject to any disclaimer, the term of this patent is extended or adjusted under 35 U.S.C. 154(b) by 974 days.

(21) Appl. No.: 14/220,869

(22) Filed: Mar. 20, 2014

(65) Prior Publication Data

US 2015/0267524 A1    Sep. 24, 2015

(30) Foreign Application Priority Data

Jun. 6, 2013    (EP) .................................... 13382214

(51) Int. Cl.
| | |
|---|---|
| G06G 7/48 | (2006.01) |
| G01V 99/00 | (2009.01) |
| E21B 41/00 | (2006.01) |
| E21B 43/00 | (2006.01) |

(52) U.S. Cl.
CPC ............ G01V 99/005 (2013.01); E21B 41/00 (2013.01); E21B 43/00 (2013.01)

(58) Field of Classification Search
CPC .................................................... G01V 99/005
USPC ........................................................... 703/10
See application file for complete search history.

(56) References Cited

U.S. PATENT DOCUMENTS

| | | | |
|---|---|---|---|
| 6,101,447 A | 8/2000 | Poe, Jr. | |
| 7,627,461 B2 | 12/2009 | Guyaguler et al. | |
| 7,657,494 B2 | 2/2010 | Wilkinson et al. | |
| 2004/0254734 A1* | 12/2004 | Zabalza-Mezghani | E21B 43/00 702/13 |
| 2007/0192072 A1* | 8/2007 | Cullick | E21B 43/00 703/10 |
| 2007/0265815 A1 | 11/2007 | Couet et al. | |
| 2008/0082469 A1 | 4/2008 | Wilkinson et al. | |

(Continued)

FOREIGN PATENT DOCUMENTS

| | | |
|---|---|---|
| CN | 2198385 Y | 5/1995 |
| CN | 103003522 | 3/2013 |
| WO | WO2007058662 | 5/2007 |

OTHER PUBLICATIONS

PCT ISR dated Sep. 8, 2014, 13 pp.

(Continued)

*Primary Examiner* — Hugh Jones
(74) *Attorney, Agent, or Firm* — Law Office of Charles W. Peterson, Jr.; Louis J. Percello, Esq.

(57) ABSTRACT

A system, method and a computer program product for to determining energy production controls for a given subterranean hydrocarbon (oil) field production and more particularly to specifying controls for sustaining optimal field production (by means of a plateau-like profile over time).

14 Claims, 2 Drawing Sheets

(56) References Cited

U.S. PATENT DOCUMENTS

| | | | | |
|---|---|---|---|---|
| 2008/0288226 A1* | 11/2008 | Gurpinar | ................. | E21B 43/00 |
| | | | | 703/10 |
| 2009/0182541 A1* | 7/2009 | Crick | ...................... | E21B 43/00 |
| | | | | 703/10 |
| 2010/0332442 A1* | 12/2010 | Goel | ...................... | G06Q 10/06 |
| | | | | 706/52 |
| 2011/0011595 A1 | 1/2011 | Huang et al. | | |
| 2011/0022363 A1* | 1/2011 | Furman | ................... | E21B 43/00 |
| | | | | 703/1 |
| 2011/0307227 A1 | 12/2011 | Poe | | |
| 2011/0307230 A1* | 12/2011 | Lee | ........................ | G01V 99/00 |
| | | | | 703/10 |
| 2011/0308792 A1 | 12/2011 | Le Ravalec et al. | | |
| 2012/0130696 A1* | 5/2012 | Davidson | ................ | E21B 43/00 |
| | | | | 703/10 |

OTHER PUBLICATIONS

PCT ISR dated Oct. 7, 2014, 11 pp.
Moho Ghazali, Abo Karim et al: "Optimizing Development Strategy and Maximizing Field Economic Recovery through Simulation Opportunity Index", Society of Petroleum Engineers, SPE, Oct. 9, 2011 (Oct. 9, 2011), XP055087186, 001: 1B . 2118/148103-MS pp. 3-5.
State Intellectual Property Office (SIPO) of China, Office Action dated Mar. 17, 2017, 7 pp.

\* cited by examiner

SELECTING AND OPTIMIZING OIL FIELD CONTROLS FOR PRODUCTION PLATEAU

CROSS REFERENCE TO RELATED APPLICATION

The present application claims priority under 35 USC § 119 to European Patent Application No. EP13382214, "METHOD FOR SELECTING AND OPTIMIZING OIL FIELD CONTROLS FOR PRODUCTION PLATEAU" to Embid Droz et al.; and is related to European Patent Application No. EP13382215, "METHOD FOR ASSESSING PRODUCTION STRATEGY PLANS" to Embid Droz et al., both filed Jun. 6, 2013 with the Spanish Patent Office, assigned to the assignees of the present invention and incorporated herein by reference.

BACKGROUND OF THE INVENTION

Field of the Invention

The present invention is related to determining energy production controls for a given subterranean hydrocarbon (oil) field production and more particularly to specifying controls for sustaining optimal field production (by means of a plateau-like profile over time).

Background Description

Energy production facility designs are normally based on general field production considerations for a given subterranean hydrocarbon (oil) field. Generally, economic business units provide a lower design limit. This limit can based on the plateau production duration and on the length of time required to recover facility construction costs. Plateau production means sustained, constant energy production for the selected production duration. The economic business units also prescribe an upper design limit for the plateau duration, typically set contractually, e.g., a contractual provision limiting production from a given field to a certain time frame, or tied to field concessions. Thus, determining field production typically includes finding production controls (e.g. field rate) that aim at sustaining constant production for a selected production duration.

Previously, designers generated plateau production profiles ad-hoc, through trial and error and guided by prior experience. Designers used simple, analytical oil production models to guesstimate an optimized plateau value. Those guesstimates, however, relied on very simple imprecise models. Those models are not robust, often lead to wrong decisions, and frequently failed to consider inherent uncertainties.

More recently, designers have used simulation-based field production to optimize designs. Considerations on the duration of the plateau (e.g., minimum and maximum duration) provided general optimization constraints to these field simulations for more accurate results. While more accurate, including uncertainty in this simulation-based approach and formulating the problem as a general optimization problem, made arriving at a solution more complex and expensive because of a multivariable optimization problem needs to be solved. Uncertainty in certain parameter (e.g. geometry of the reservoir) is typically quantified by considering a set of parameter distributions, each of them with an associated probability. Arriving at a solution frequently requires thousands of reservoir flow simulations, taking several days of computations to complete. Thus, the associated computing cost may be prohibitive. Moreover, this approach frequently is unsuited for interactive, rapid decision-making.

Thus, there is a need for quickly, inexpensively and methodically generating field production controls that, under quantifiable uncertainty, aim at optimizing sustained production (i.e. by means of a plateau-like profile over time), and, also for generating field production controls for achieving a previously given plateau duration.

SUMMARY OF THE INVENTION

According to reservoir engineering terminology, field oil production rate (FOPR) refers to the rate of oil production for the entire field, and it is typically measured in barrels per day (bbl/day). Together with oil, producer wells may also produce other fluids (e.g. water). Thus, field fluid production rate (FFPR) refers to rate of fluid production for the entire field.

Similarly, field fluid injection rate (FFIR) is related to the total amount of fluid injected to sweep the oil. Commercial fluid flow simulators (e.g. ECLIPSE) allow (using efficiency guidelines) to determine the rate over time for each individual well (injectors and producers) given, for example, the desired FOPR, and the fact that FFPR should be equal to FFIR (this last strategy is known as voidage replacement and aims at maintaining internal pressure in the reservoir for better structural stability). Since the amount of oil initially present in a reservoir is finite, it is not possible to sustain a given value of FOPR indefinitely. The plateau duration $L_{plt}$ associated with FOPR is the longest duration for which the field yields an oil production rate equal to FOPR. For a relatively large range of values of FOPR that can be used in practice, we can assume that the plateau duration associated with a value of FOPR is inversely proportional to that FOPR value, and that for that range there is a one-to-one correspondence between FOPR and the plateau duration associated to that FOPR value.

The plateau duration $L_{plt}$ can be directly obtained via flow simulation. The inverse relation (i.e. FOPR given $L_{plt}$) is not directly obtained via flow simulation and according to one aspect of the invention this inverse correspondence can be determined taking into account additional bound conditions.

Along the description we assume that the uncertainty is on the geological description of the reservoir (other types of uncertainty can be included in similar fashion as this one). Since the geological description of the reservoir is uncertain, the geological parameters associated with the reservoir cannot be considered as known. A common approach is to generate a set of geologically plausible distributions of the unknown parameters which are consistent with some information available (e.g. measurements at some pilot wells). Thus, we consider multiple geological models rather than a single (deterministic) model. Consequently, using reservoir simulation we determine a set of production forecasts, rather than a single forecast. Statistics determined for this set can be eventually considered in optimization (for example, average field oil production rate and average net present value).

An aspect of the invention is the generation of field production controls for production plateau, being a method that comprises determining a reservoir model, providing numerical tools adapted to generate a development plan comprising a facilities model and the controls for a predetermined production rate, preferably the FOPR, this development plan comprising:

distribution of production well locations and optionally injection well locations for the reservoir model, a drilling schedule and, a control of the wells, providing numerical tools adapted to simulate the reservoir model under the development plan conditions for the predetermined production rate adapted to generate an average production profile and the plateau duration.

Drilling schedule lay down the order of drilling of the wells and the time instant in which each well is drilled. The control of the wells lay down the flow rate of each well over time.

Once the development plant has defined the distribution of the well locations, the drilling schedule and the control of the wells, a ranking measure such as the net present value (NPV) can be determined.

The method comprises the following iterative procedure for the selection of the controls for production plateau:
provide a guess for the production rate variable,
provide a cost function that evaluates an average ranking measure, preferably the net present value NPV, for the facilities model according to the production rate variable,
while the average ranking measure is not maximum carrying out the following steps:
simulate the reservoir model for the production rate value providing the facilities model and the average ranking measure,
if the average ranking measure is not maximum generating a new production rate,
provide the field controls according to the production rate that makes the average ranking measure maximum.

According to an embodiment of the invention the generation of field production controls are calculated under quantifiable uncertainty, maximize net present value (NPV) for a particular reservoir and that sustain constant field production (by means of a plateau-like profile over time). The NPV calculation may include simple cost models for the production/injection facilities.

Another feature of the invention is the generation field rate controls that, under quantifiable uncertainty, yield a production plateau of a previously specified duration. If this duration is not feasible, the invention outputs the field controls that yield the closest feasible duration to the specified duration (e.g. the FOPR value associated with the outputted $L_{plt}$ satisfies the constraints imposed).

Embodiments of the invention relates to a method for determining field controls for oil production that, under quantifiable uncertainty, maximize some exploitation performance metric such as net present value. A field oil production rate (FOPR) is selected when making the exploitation performance metric maximum, the optimized production profiles and associated uncertainty are made available (and can be used, for example, for assessing facilities designs). Otherwise, a new FOPR is selected for another iteration and the average production is determined until a maximum is found.

The present invention also relates to a system, method and a computer program product for determining field controls for oil production that, under quantifiable uncertainty, yield a production plateau of a desired duration (this production plateau duration may be given, for example, by economic business units, and can be related to considerations on injection/production facilities).

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
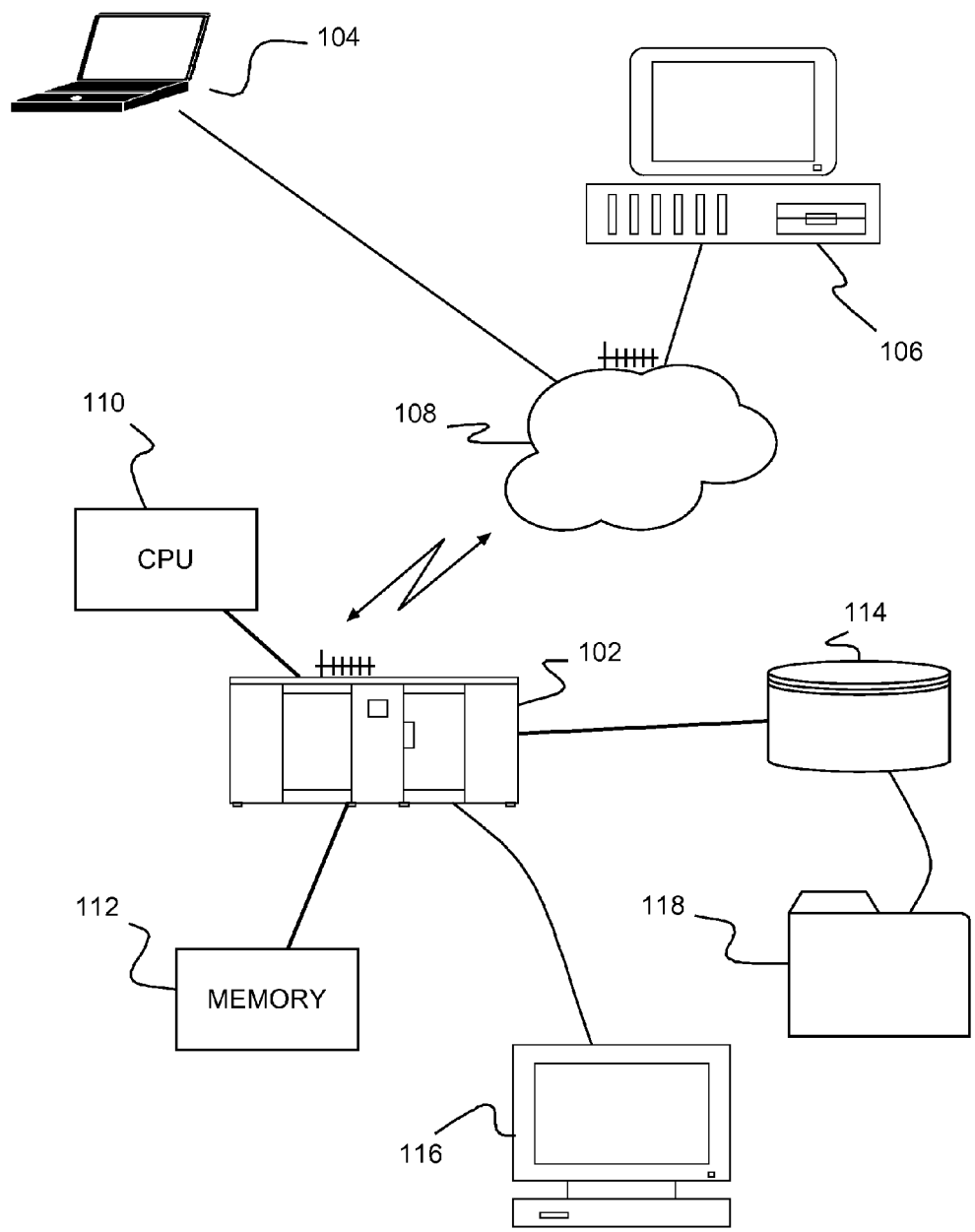
FIG. 1 shows an example of an example of a facility design system for selecting a hydrocarbon energy (oil/gas) facility configuration for optimal production from a particular field or reservoir, according to a preferred embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the drawings and more particularly, FIG. 1 shows an example of a system for determining field production controls 100 that selects hydrocarbon energy (oil/gas) field production configurations, according to a preferred embodiment of the present invention. In selecting an optimized field production configuration the preferred system 100 determines field oil production rate (which is sustained over time as much as possible; this yields a plateau-like production profile of duration $L_{plt}$) from a subterranean oil reservoir; and further, assesses an associated uncertainty for resulting oil production.

A preferred design system 100 includes one or more computers 102, 104, 106 (3 in this example), coupled together, e.g., wired or wirelessly over a network 108. The network 108 may be, for example, a local area network (LAN), the Internet, an intranet or a combination thereof. Typically, the computers 102, 104, 106 include one or more processors, e.g., central processing unit (CPU) 110, memory 112, local storage 114 and some form of input/output device 116 providing a user interface. The local storage 114 may generate and/or include a set of models 118 for a reservoir being evaluated for production.

The preferred design system 100 develops production profiles (i.e. descriptions of production-related quantities as functions of time) from economic criteria, such as net present value (NPV) for example, in consideration of facilities design related capital expenditure (CAPEX) elements. From these production profiles, one can determine field production controls required for maximizing production in exploiting a corresponding field. In particular, the production profiles are for plateau-like energy production with a constant energy production rate (during at least some portion of the production time frame), that corresponds to the total amount of material produced in the particular field. The preferred design system 100 and method also facilitates field controls for energy production during a previously specified plateau duration ($L_{plt}$). The output of the design system 100 can be used to design injection/production facilities needed for the field exploitation.

Thus, applied to hydrocarbon energy production, a preferred design system 100 optimizes field oil production rate for a set of reservoir models, in a single variable optimization problem constrained by upper and lower variable bounds. A preferred design system 100 formulates this single variable optimization problem as an optimization cost function for exploiting a respective energy production field. Application of the optimization cost function to production field simulation provides a maximum average field production for the set, where the maximum average production identifies the optimal production rate (with an associated production duration) under a quantifiable uncertainty.

For energy production, the single optimization variable is the field oil production rate (FOPR) and all other simulation inputs are known or previously determined. For example, individual rates at production/injection wells can be obtained by means of commercial simulators which often incorporate well rate allocation algorithms. Optimization constraints include upper and lower bounds for FOPR. These bounds may be given by economic business units, or alternatively, this bounds are imposed for instance by plateau durations. For the range of interest we assume a one-to-one correspondence between FOPR and $L_{plt}$. Some other bounds may be dealt with by a pre-processing step or through nonlinear constraints in the optimization.

In a further embodiment the single optimization variable is the plateau duration wherein the correspondence between FOPR and $L_{plt}$ is used. In this embodiment, a further iterative method is used for the precise value of the FOPR for a determined $L_{plt}$ value. Thus, a preferred design system 100 determines the necessary energy (oil/gas) field production rate (and corresponding production plateau duration) to maximize NPV by solving for FOPR as the only unknown. Additionally, and with FOPR as only unknown as well, the system 100 calculates the energy field production rate needed to obtain a specified production plateau duration, that is, the correspondence between FOPPR and $L_{plt}$.

Optimization culminates in a maximum average NPV (over the set of reservoir models used) together with a quantification of uncertainty associated with this maximum average NPV. The uncertainty may be quantified (in particular for the FOPR that maximizes average NPV) by means of all the production responses determined in the average production unit 134 wherein these production responses are also used to determine the average NPV.

Thus, the field oil production rate (and corresponding production plateau duration) to arrive at that maximum average NPV identify an optimal solution for the optimization cost function and an optimal operating point for the production field. Designers use the optimized field oil production rate and production plateau duration to design and specify design facilities for the production field.

Designers can determine field injection controls, subsequently, after selecting a specific control strategy. For example, injection wells may not be needed in aquifer-driven fields. Conversely, when water-flooding is used, voidage replacement defines a field water injection rate equal to the field fluid production rate. Voidage replacement aims at maintaining reservoir pressure and endowing production with structural stability.

Further, treating the field production rate as distributed among all producer wells, the design system 100 can determine an individual production rate for each well. Reservoir flow simulators are commercially available for flow rate distribution. Typical available commercial reservoir flow simulators include, for example, ECLIPSE from Schlumberger Limited, and IMEX from Computer Modelling Group Ltd.

Figure 2A:
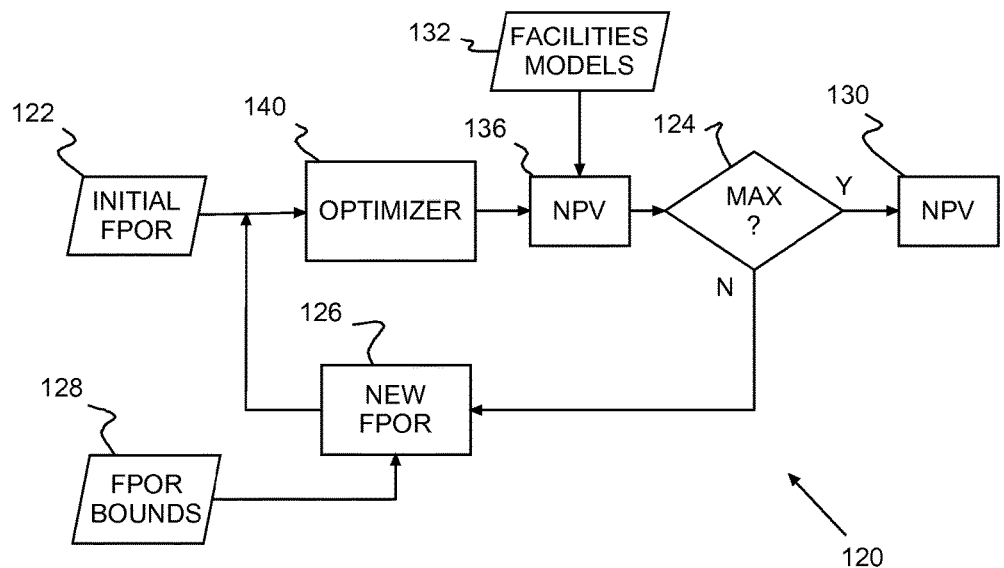
FIGS. 2A-B show an example of iteratively developing a production profile of desired plateau duration and an optimizer for the production profile.

FIG. 2A shows an example of one aspect of the invention using a preferred design system (e.g., 100 of FIG. 1) for iteratively developing an optimization unit 120 that maximizes NPV. This NPV is determined for an average production profile obtained for instance via reservoir flow simulation for all models used to quantify uncertainty (e.g., 118 in FIG. 1).

Alternatively, this average production profile could be approximated using only one reservoir flow simulation for an average reservoir model or may be provided as a known function.

The NPV calculation includes cost models for the facilities 132 that require as input average production profiles. These models can be, for example, exponential cost models that penalize large production.

Initially, a value for FOPR 122 is projected or supplied (e.g., by an engineer, designer or other expert) to the average production unit 134 (this unit also quantifies the associated/propagated uncertainty). The unit 120 optimizes for a single variable (field oil/liquid production rate).

After each iteration the unit 124 checks the result to determine if the average NPV is a maximum. Otherwise, the optimization unit 120 receives or determines a new FOPR 126 within FOPR bounds 128. The new FOPR may be proposed for instance by means of Newton-Raphson methods estimating tangent values using previous values obtained in former steps or other numerical methods.

These bounds may e.g. correspond to limits of FOPR or of the plateau duration value given by economic units. For example, these limits may be implemented at a given iteration checking that the new FOPR is larger than a $FOPR_{min}$ limited by a maximum plateau duration. In this case, if the production rate or the plateau duration is not feasible, the preferred design system 100 provides field controls that yield closest feasible values.

In the next iteration, the unit 120 generates a new average NPV (and associated uncertainty) from the new value for FOPR 126. If the check 124 determines that the result is a maximum, the final result 130 is outputted together with the corresponding distributions. This result can be used for selecting a final design of the injection/production facilities.

Initially for example, a user, engineer or other designer may provide an optimization value 122. Alternately, the design system 100 may select the initial optimization value 122 automatically determined from available data considerations, or from the optimization variable bounds 128. Available data considerations may include, for example, estimated original oil in place and expected plateau duration and oil recovery factor. Automatically determining the initial optimization value 122 from optimization variable bounds 128 includes, for example, selecting the midpoint between bounds.

Since optimization is for a single variable, the optimization in 120 arrives at a solution with acceptable precision in practice in a relatively small number of iterations, generally less than ten. Preferably, the optimization is solved using a bound-constrained nonlinear optimizer (the cost function is an average NPV 136 for the value of interest for FOPR, and the optimization bounds are specified e.g. by economic business constraints). Accordingly, the present invention quickly arrives at an optimized FOPR plateau value (which has a corresponding optimal plateau duration due to the one-to-one relationship between $L_{plt}$ and FOPR).

Further, the description of any reservoir generally carries uncertainty (quantified e.g. by a set of models and corresponding probabilities each). Thus, the optimization in 120 considers averaging operators. For example, the porosity may be modeled as a probability-weighted arithmetic mean for the porosity distribution for each model in a set (the porosity distribution for the reservoir model describes the amount of pore/empty space for the spatial region modeled). Other reservoir properties may be averaged likewise. Thereafter, a reservoir flow simulation is performed considering average properties. Alternatively, a reservoir flow simulation can be run for each reservoir model in the set, and the average operator is applied to all the production profiles obtained. This second option captures better nonlinear effects in the propagation of uncertainty but at the expense of being computationally more expensive than performing a single simulation on an average reservoir model. In conclusion, the present invention propagates the uncertainty from the reservoir model to the final, resulting 130 FOPR, plateau duration and net present value (this latter including cost models for the injection/production facilities).

The optimal NPV is obtained by an iterative method using the FOPR variable. This method may also be solved using the plateau duration because the one-to-one correspondence between both variables. That is, the optimization 120 is reproduced replacing the FOPR variables by the unit 140 resulting in a method expressed in the $L_{plt}$ variable.

Figure 2B:
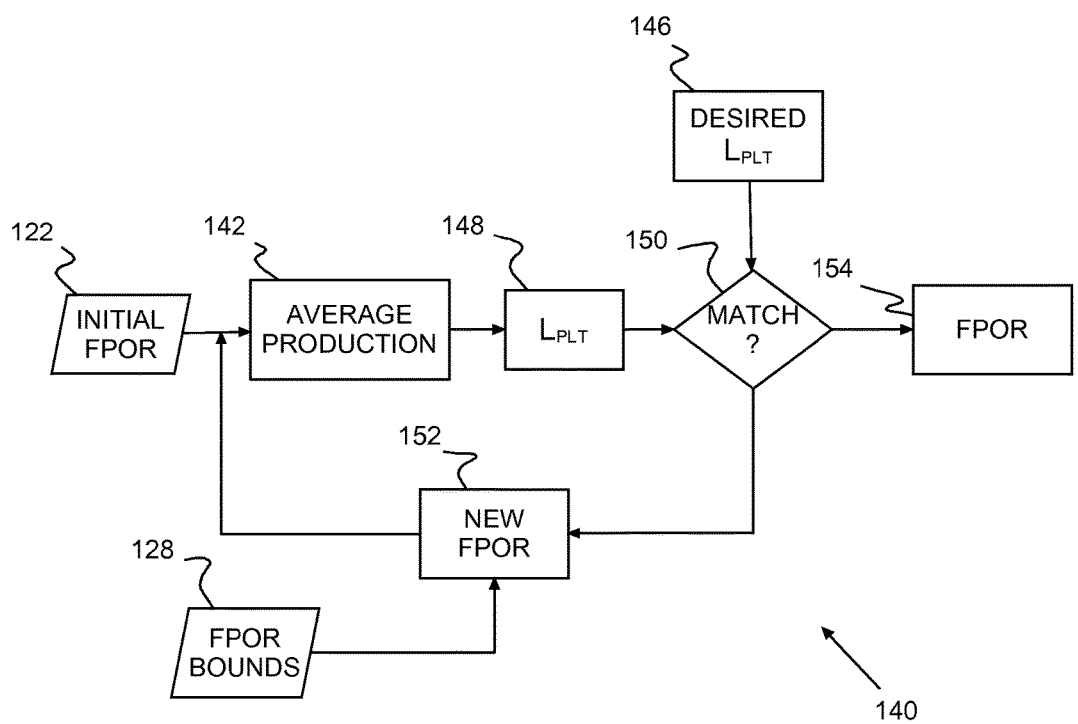

FIG. 2B shows an example using a preferred design system (e.g., 100 of FIG. 1) for iteratively developing a production profile that yields a previously specified oil production plateau duration 146.

The inverse relation between FOPR and plateau duration cannot be directly obtained from flow simulation. In this case the inverse relation can be estimated providing a one-dimensional function based on the knowledge of the engineer, designer or other expert; or, it can be obtained in an accurate manner as described hereinbelow.

Given a value for FOPR, flow simulation over a reservoir model provides the production plateau duration for such reservoir model. When a plurality of reservoir models matching the information on the field are simulated, statistics measured over the plurality of reservoir models provide the statistics quantifying uncertainty. That is, the plateau duration 148 is determined for an average production profile obtained via reservoir flow simulation for all models used to quantify uncertainty (e.g., 118 in FIG. 1). Alternatively, this average production profile could be approximated using only one reservoir flow simulation for an average reservoir model.

Initially, a value for FOPR 122 is projected or supplied (e.g., by an engineer, designer or other expert) to the average production unit 134 (this unit also quantifies the associated/propagated uncertainty). The unit 140 solves for a single variable (field oil/liquid production rate). After each iteration the unit 150 checks the result to determine if the average plateau duration is the value desired 146 or, alternatively, if it is the closest value to the desired value that can be obtained. Otherwise, the solving unit 140 receives or determines a new FOPR 152 within FOPR bounds 128. These bounds may e.g. correspond to limits of FOPR or of the plateau duration value given by economic units. In the next iteration, the unit 140 solves for a new production plateau value and associated uncertainty for the new value FOPR 152.

If the check 150 determines that the result is the value desired 146 or, alternatively, if it is the closest value to the desired value that can be obtained, the final FOPR result 154 is made available.

The unit 140 solves the average oil production given a plateau duration for a set of reservoir models. The design system 100 may apply clustering/sampling techniques to the reservoir model set to reduce/limit the number of models considered to a relatively small number, e.g., a few tens of models. Although described herein for a complete oil field, the present invention can be applied to a set of wells previously grouped, for example, using geological and/or surface distance constraints.

The nonlinear optimizer propagates uncertainty, for example, by averaging production profiles obtained from reservoir flow simulation for each reservoir model in the set. In this context, production forecasts are thus a collection of predictions from all reservoir models in the set and associated uncertainties. Thus, a preferred design system 100 determines predictions (where oil production presents plateau profiles) from complex reservoir flow simulations, and further, while preserving a level of accuracy in the design satisfactory for most practical applications. Accordingly, the present invention has application to scenarios that may require a quick decision in a short period of time (i.e., in hours or at most a few days).

Once the optimal FOPR is determined, for a predetermined replacement factor (the rate between the injected flow and the produced flow, typically 1), the rate over time for each individual well (injectors and producers) is determined for instance using a commercial program and therefore the controls for the production plateau.

Thus advantageously, the present invention provides a much more efficient approach for finding field production controls than prior art ad-hoc and trial-and-error design approaches. Further, the present invention is computationally much less expensive than prior approaches that were based on general simulation-based optimizations, typically considering a large number of optimization variables (e.g., a few hundreds of variables) that very often required thousands of reservoir flow simulations. Instead, the present invention reduces design decisions to a single variable solution for quickly arriving at a solution, e.g., the field oil production plateau rate FOPR or the duration of that plateau.

All this, combined with clustering/sampling techniques that reduce the number of reservoir models used for uncertainty quantification, allows one to obtain acceptable solutions in a timely manner for designs where rapid, interactive decision-making is key.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A method of selecting and optimizing oil field controls for production plateau comprising:
    determining a reservoir model from a description of a reservoir, at least one parameter in said description having an uncertain value and being a source of uncertainty in modeling said reservoir;
    providing numerical tools adapted to generate a development plan comprising a facilities model and the controls for a predetermined production rate, said development plan comprising:
        a distribution of production well locations and optionally injection well locations for the reservoir model,
        a drilling schedule, and
        a control of the wells;
    providing numerical tools adapted to simulate said reservoir model under said development plan conditions for the predetermined production rate adapted to generate an average production profile and the plateau duration and to quantify an associated uncertainty responsive to reservoir description uncertainties,
    wherein the selection of the controls for production plateau comprises iteratively:
        providing an initial value for the production rate variable,
        providing a cost function that evaluates an average ranking measure, according to the production rate variable, and while the average ranking measure is not maximum:
            simulating the reservoir model for the production rate value providing the facilities model and the average ranking measure, and
            if the average ranking measure is not maximum generating a new production rate;
        providing the field controls according to the production rate, wells being drilled according to said drilling schedule distributed according to the well location distribution; and
        controlling well production responsive to the field controls for maximum average ranking measure at said associated uncertainty.

2. A method according to claim 1, further comprising providing at least one of the production rate corresponding to the maximum of the cost function, and the average ranking measure corresponding to the maximum of the cost function.

3. A method according to claim 1 wherein said predetermined production rate is the field oil production rate (FOPR), said average ranking measure is the net present value NPV, and generating the new production rate is bounded.

4. A method according to claim 1 wherein the iterative method is iterated using the plateau duration $L_{plt}$ in such a way that the production rate is a function of the plateau duration $L_{plt}$ determined according to the following steps:
    for the desired $L_{plt}$, provide an initial production rate value,
    carrying out a further second iterative method within a selected maximum number of iterations wherein while the difference between the desired $L_{plt}$ and the plateau duration $L_{plt}$ determined by simulation for the production rate is larger than a predetermined threshold a new production rate is proposed, and if the number of iterations is said maximum number, selecting a previously determined said production rate that corresponds to the closest plateau duration to the desired $L_{plt}$, and provide the last production rate.

5. A method according to claim 1 wherein the iterative method is iterated using the plateau duration $L_{plt}$ in such a way that the production rate is expressed as a function of the plateau duration $L_{plt}$ according to an estimation or an interpolation function of a set of known samples.

6. A method according to claim 4 wherein the new production rate proposed in the second iterative method is bounded by upper variable bounds, lower variable bounds, or both.

7. A method according to claim 4 wherein the new production rate is proposed using an optimization unit.

8. A method according to claim 1 wherein determining the reservoir model includes determining modeled reservoir uncertainty comprising:
   determining a set of realizations having a geological distribution for each said at least one parameter responsive to available field information,
   simulating the reservoir model and measurements over the set of realizations; and,
   providing the statistical uncertainty values.

9. A method according to claim 1 wherein determining the reservoir model includes reservoir uncertainty modeled as:
   determining a set of realizations having a geological distribution for each said at least one parameter responsive to available field information,
   simulating the reservoir model and measurements on a single average realization over the set of realizations; and,
   providing the statistical uncertainty values.

10. A system for selecting and optimizing oil field controls for production plateau, said system comprising:
    means for determining a reservoir model from a description of a reservoir, at least one parameter in said description having an uncertain value and being a source of uncertainty in modeling said reservoir;
    means for providing numerical tools adapted to generate a development plan comprising a facilities model and the controls for a predetermined production rate, said development plan comprising:
       a distribution of production well locations and optionally injection well locations for the reservoir model,
       a drilling schedule, and
       a control of the wells;
    means for providing numerical tools adapted to simulate said reservoir model under said development plan conditions for the predetermined production rate adapted to generate an average production profile and the plateau duration and to quantify an associated uncertainty responsive to reservoir description uncertainties,
    means for selecting controls for the production plateau comprising:
       means for providing an initial value for the production rate variable,
       means for providing a cost function that evaluates an average ranking measure, according to the production rate variable,
       means for iteratively simulating the reservoir model for the production rate value while the average ranking measure is not maximum to provide the facilities model and the average ranking measure, and generating a new production rate while the average ranking measure is not maximum,
       means for providing the field controls according to the production rate, wherein wells are drilled according to said drilling schedule and distributed according to the well location distribution; and
    means for controlling well production responsive to the field controls for maximum average ranking measure at said associated uncertainty.

11. A system according to claim 10, wherein said predetermined production rate is the field oil production rate (FOPR), and said average ranking measure is the net present value NPV, said system further comprising:
    an optimization unit providing new production rates; and
    means for providing a production rate corresponding to the maximum of the cost function, the average ranking measure being selectively provided.

12. A system as in claim 10, wherein said means for iteratively simulating comprises:
    means for providing an initial production rate for the desired plateau duration;
    means for determining a new production rate;
    means for determining the difference between the desired plateau duration and the determined plateau duration for the production rate within a predetermined threshold;
    means for returning to determining said new production rate; otherwise
    means for providing the last determined production rate.

13. A system as in claim 10, wherein said means for determining the reservoir model comprises means for determining modeled reservoir uncertainty comprising:
    means for determining a set of realizations having a geological distribution for each said at least one parameter responsive to available field information,
    means for simulating the reservoir model and measurements over the set of realizations; and
    means for providing the statistical uncertainty values.

14. A system as in claim 10, wherein said means for determining the reservoir model comprises means determining modeled reservoir uncertainty comprising:
    means for determining a set of realizations having a geological distribution for each said at least one parameter responsive to available field information,
    means for simulating the reservoir model and measurements on a single average realization over the set of realizations; and
    means for providing the statistical uncertainty values.

* * * * *